United States Patent
Cheriton (10) Patent No.: US 6,981,052 B1
(45) Date of Patent: Dec. 27, 2005

(54) DYNAMIC BEHAVIORAL QUEUE CLASSIFICATION AND WEIGHTING

(75) Inventor: David R. Cheriton, Palo Alto, CA (US)

(73) Assignee: Cisco Technology, Inc., San Jose, CA (US)

(*) Notice: Subject to any disclaimer, the term of this patent is extended or adjusted under 35 U.S.C. 154(b) by 742 days.

(21) Appl. No.: 10/010,235

(22) Filed: Dec. 7, 2001

(51) Int. Cl.[7] .......................... G06F 15/16; H04L 12/28
(52) U.S. Cl. ...................... 709/232; 709/238; 370/229; 370/230; 370/231; 370/232; 370/233
(58) Field of Search ................................ 709/234, 232, 709/238; 370/395.4, 229, 216, 230–233

(56) References Cited

U.S. PATENT DOCUMENTS

| | | | | |
|---|---|---|---|---|
| 5,253,248 | A * | 10/1993 | Dravida et al. | 370/228 |
| 6,262,986 | B1 * | 7/2001 | Oba et al. | 370/399 |
| 6,519,259 | B1 * | 2/2003 | Baker et al. | 370/395.4 |
| 6,570,883 | B1 * | 5/2003 | Wong | 370/412 |
| 6,728,270 | B1 * | 4/2004 | Meggers et al. | 370/514 |
| H002103 | H * | 5/2004 | Modiano | 370/230 |
| 6,754,215 | B1 * | 6/2004 | Arikawa et al. | 370/395.4 |
| 6,810,426 | B2 * | 10/2004 | Mysore et al. | 709/234 |
| 6,850,540 | B1 * | 2/2005 | Peisa et al. | 370/468 |
| 6,882,623 | B1 * | 4/2005 | Goren et al. | 370/230 |

\* cited by examiner

*Primary Examiner*—Krisna Lim
(74) *Attorney, Agent, or Firm*—Campbell Stephenson Ascolese LLP (57) ABSTRACT

The present invention defines a method and apparatus to extend class-based queuing (CBQ) with multiple "behavioral" queues per class, to include a dynamic weighting mechanism between these queues. The packets are forwarded from the behavioral queues according to the weighting assigned to each queue. The weighting for packet scheduling of the queues is adjusted to account for additional flow going through the queues. The weight of a queue is controlled relative to the weight available to other queues. When a flow is reclassified, the queue weights is readjusted accordingly. Well behaved flows experience low delay and can thus achieve a fair bandwidth allocation without having to have multiple packets queued to compete with non-adaptive aggressive flows.

104 Claims, 4 Drawing Sheets

DYNAMIC BEHAVIORAL QUEUE CLASSIFICATION AND WEIGHTING

BACKGROUND OF THE INVENTION

1. Field of the Invention

This invention relates to the field of packet routing and more particularly relates to methods and apparatus for managing traffic flow in routers and switches.

2. Description of the Related Art

Routers in a network receive packets from different data streams. Each data stream is classified based on various characteristics of the data (e.g., type of data, source address, destination address, protocol used or the like). Such a data stream can be referred to as 'flow'. During traffic congestion in the network, some flows dynamically adapt to available bandwidth and control the data rate accordingly. The flows that adapt to available bandwidth are referred to as Well Behaved Flows ("WBF"). When faced with packet drops (i.e., packets discarded deliberately by a downstream device due to congestion at that device), these WBFs reduce their flow rates and send fewer packets per unit of time. WBFs, such as conventional TCP flows, implement a control loop to adjust transmission rate to the rate available through the bottleneck link on the path. By adjusting the rate, WBFs have no packets queued at routers through which the WBFs transit much of the time.

Other flows, however, do not dynamically adapt to available bandwidth. Non-adaptive flows are referred to as Non-adaptive Aggressive Flows ("NAF"). NAFs do not throttle back the flow of packets to the router when they experience packet drops. This may be because either the NAFs do not recognize the congestion (e.g., due to protocol incompatibilities), or because the NAFs actually are trying to capture more router bandwidth during the congestion. A flow that sends packets at an excessive rate can deplete buffer and queue resources causing packet delay and drop by WBFs.

Buffer/queue management mechanisms can reduce the amount of buffering used by aggressive flows. However, it is very difficult to reduce buffer consumption to zero without denying the flow altogether. It is often difficult to determine whether the flow is truly non-adaptive or simply slow to adapt because of roundtrip packet delay in the network. Consequently, NAFs are often allowed a minimal amount of buffering. Unfortunately, even minimum amount of buffering can cause persistent queues and buffer consumption at a port, causing extra delay for WBFs.

For example, when a router limits the buffering for NAF to two packets and 100 NAFs go through a port then assuming FIFO queuing, each WBF can be delayed by 200 packet times. WBFs need to have at least as many packets queued as the NAFs on that port to get a comparable data rate through the router. WBFs need more queue space because of their back-off reaction to packet drop and the congestion. Consequently, with 100 WBFs and 100 NAFs through a given port, a new packet can expect to experience a queuing delay of 400 packet times or more.

Several flow regulation schemes are known in the art. Broadly classified, these schemes fall into two types: queue-based and buffer-based. In queue-based schemes, incoming flows are classified according to their actual priority, as determined by the receiving router, and assigned accordingly to output queues within the router. These schemes are generally referred to as "class-based queuing" (CBQ) techniques. High priority flows, such as time-sensitive voice traffic, are placed in a queue that is read out more often. Low priority flows, such as file transfer protocol (FTP) or hypertext transfer protocol (HTTP) flows, are placed in queues that are read out of the router at a slower rate. Per flow queuing is expensive in memory and processing is complex to implement, particularly in high-speed switches.

In buffer-based management scheme, the router limits the amount of packet buffers assigned to a particular input flow. Such limits on the number of packets buffered per flow can be either static or dynamic. In the static or strict limit scheme, a set maximum number of buffers is available for each flow. Any packets received after those buffers are full, the router discards the packets. The static limits are set by the system administrator for each type of flow. However, buffer-based scheme has the obvious drawback of high overhead associated with setting up a gating mechanism for each flow and administrative oversight. Additionally, buffer-based scheme lacks long-term flexibility to adapt to the wide variety and constantly changing mix of flow types.

Alternately, flows can be individually policed to the available rate. A packet can be dropped if the flow is over its allotted rate. However, this approach would require a large number of policers, and rapid modification of the policer rate as the available bandwidth and number of flows at a port changes. What is needed is a dynamic method of flow control that is able to rapidly adapt to flows and prevent NAFs from unfairly seizing bandwidth.

SUMMARY

According to an embodiment of the present invention, a method of forwarding packets is described. The method includes storing packets in one of various behavioral queues according a flow behavior, assigning a weighting to behavioral queues and forwarding the packets from behavioral queues according to the weighting. The method further includes, dynamically classifying packets according to various flow behaviors. The method further includes, receiving the packets and determining whether the behavioral queue is full. If the behavioral queue is full, dropping the packets. The method further includes, if the packets have well behaved flow, storing the packets in a well behaved flow behavioral queue. The method further includes forwarding the packets according to the weighting of the well-behaved queue.

The method further includes if the packets have the non-adaptive aggressive flow, storing the packets in a non-adaptive aggressive flow behavioral queue. The method further includes determining whether the non-adaptive aggressive flow behavioral queue has reached a scheduling threshold. If the non-adaptive aggressive flow behavioral queue has reached the scheduling threshold, determining whether a packet forwarding schedule of the non-adaptive aggressive flow behavioral queue requires adjustment. If the packet-forwarding schedule of the non-adaptive aggressive flow behavioral queue requires adjustment, adjusting the packet-forwarding schedule of the non-adaptive aggressive flow behavioral queue. The method further includes forwarding the packets according to the weighting of the non-adaptive aggressive flow behavioral queue. The method further includes if the packet forwarding schedule of the non-adaptive aggressive flow behavioral queue does not require adjustment, forwarding the packets according to the weighting of the non-adaptive aggressive flow behavioral queue.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and numerous objects, features, and advantages made apparent to those skilled in the art by referencing the accompanying drawing.

DETAILED DESCRIPTION OF THE INVENTION

The following is intended to provide a detailed description of an example of the invention and should not be taken to be limiting of the invention itself. Rather, any number of variations may fall within the scope of the invention which is defined in the claims following the description.

Introduction

The present invention defines a method and apparatus to extend class-based queuing (CBQ) with multiple "behavioral" queues per class, to include a dynamic weighting mechanism between these queues. The packets are mapped to one of these behavioral queues within a class. WBF packets are queued to specific WBF queue for that class and NAF packets are queued to specific NAF queue for that class. Each behavioral queue is assigned a 'weight'. The packets are forwarded from the behavioral queues according to the weighting assigned to each queue. According to an embodiment of the present invention, the weighting for packet scheduling of the NAF queue is adjusted to account for additional flow going through the NAF queue. The share of the link bandwidth allocated to NAFs (versus WBFs) can be controlled by changing the queue weighting parameters. Each additional NAF may increase the weight given to its corresponding NAF queue. The weight of the queue is controlled relative to the weight available to the WBF queue. A NAF may subsequently be reclassified as a WBF, causing its subsequent packets to be queued in the WBF queue and the weights readjusted accordingly. WBFs experience low delay and can thus achieve a fair bandwidth allocation without having to have multiple packets queued to compete with NAFs.

Dynamic Weighting Mechanisms

According to an embodiment of the present invention, the packet flows can be classified based on various predefined flow characteristics (e.g., Quality of Service (QoS), type of data, protocol used or the like) or can be dynamically calculated based on the actual flow behaviors. Each classified flow is assigned to a classification-based queue ("CBQ"). Each CBQ is further sub-classified into behavioral sub-queues. The methods of classifying flows, CBQ and behavioral sub-queues are known in the art. A router can support multiple classifications for data flows (e.g., flows with multiple QoS or the like). The router assigns certain priority to incoming flow based on the incoming flow classification. Once a flow is classified, the packets from that flow are forwarded to assigned queues. The assigned queues are further classified into sub-queues based on the behavior of data streams within a particular flow. The packets are then forwarded from the assigned sub-queues according to conventional queue sharing algorithms using the weighting schemes assigned to each sub queue.

For example, for the purposes of illustration, a flow 'A' is classified based on a QoS of '3'. The router assigns a queue 'Q1' for QoS-3 flows with space for 10 packets. Flow 'A' further includes packets from two sources, source S1 and source S2. In this example, source S1 does not adapt to traffic congestion (i.e. a NAF) and source S2 controls the data rate to adapt to traffic congestion (i.e. a WBF). When Q1 is full, the router starts to drop incoming packets from flow 'A'. When source S2 recognizes the packet drop, source S2 reduces the data rate and sends packets with a longer interval to allow the router to clear queue Q1. However, S1 does not adapt to the traffic congestion and continues to send packets to the router. Whenever the router has space in Q1, source S1 will push packets through because source S1 does not reduce the data rate. Because source S1 does not adapt to traffic congestion, source S1 can get unfair proportion of Q1 and can send more packets even though both source S1 and source S2 have the same classification, QoS-3.

According to one embodiment of the present invention, once the flow has been classified based on a classification scheme (e.g., QoS-3 or the like), the assigned queue, queue Q1 can be further configured into sub-queues Q1-A and Q1-B. Each sub-queue is assigned a 'weight'. The weight for each queue can be pre-assigned by the network administrator or dynamically calculated by the router. For the purposes of illustration, in the foregoing example, Sub-queue Q1-A is assigned to WBFs with an assigned weight of eight thus, eight packet spaces and sub-queue Q1-B is assigned to NAFs with an assigned weight of two thus, two packet spaces. However, it will be apparent to one skilled in art that any weighting scheme can be used for each queue. The router then schedules each queue for packet forwarding. When the router experiences the traffic congestion, the packets from WBFs (e.g. S2 flow) are forwarded more frequently compared to the packets from NAFs (e.g., S1 flow).

In one embodiment of the present invention, the packets from NAF queue (e.g., sub-queue Q1-B) are scheduled for forwarding when the size of the NAF queue (e.g., sub-queue Q1-B) reaches certain scheduling threshold. The scheduling threshold can be predetermined during router the provisioning (e.g., scheduling packets after a fixed number of packets are accumulated in the queue, the size of the NAF queue (e.g., sub-queue Q1-B) reaches a certain factor of the size of the WBF queue (e.g., sub-queue Q1-A) or the like). The scheduling threshold can be dynamically adjusted by the router based on resource constraints at the time of scheduling. When the traffic congestion improves, the router can dynamically alter the weight for each behavioral queue. For example, when WBF rate decreases and more queue space can be accommodated, the router can dynamically increase the weight of NAF queue (e.g., sub-queue Q1-B) weight to allow more packets to pass through. The packets from sub-queues Q1-A and Q1-B can be forwarded according to conventional queue sharing schemes employed by the router.

In one embodiment of the present invention, the data rate of the incoming flow is used to determine the queue weighting for each behavioral flow. For example, when the router has certain assigned data rate for a classification, the router can limit the data rate for each behavioral flow within that class to a specified data rate. For the purposes of illustration, in the forgoing example, the router has assigned a data rate of 10 Mbps for QoS-3 flows. The router limits the data rate for WBF queue (e.g., sub-queue Q1-A) to 9.5 Mbps and for NAF queue (e.g., sub-queue Q1-B) to 0.5 Mbps. The flow from source S2 is allowed to pass through as long as the data rate of source S2 flow is within 9.5 Mbps. Similarly, the packets from source S1 are dropped when the data rate of source S1 flow increases more than 0.5 Mbps. When the traffic congestion improves, the router can dynamically alter the allocated data rate for each behavioral queue to release behavioral flow congestion.

Change in Flow Behavior

The behavior of a classified flow (e.g. a particular QoS or the like) can change during traffic condition. When a router drops packets from a NAF due to traffic congestion, the source of NAF can change the flow to adapt to available bandwidth. Similarly, more sources can add traffic of a particular class to a WBF thus, forcing WBF into a NAF. When flow behaviors change, the router can dynamically adjust the weighting of each flow to accommodate the change in the flow behavior. For the purposes of illustrations, in the foregoing example, when a WBF subsequently changes the flow behavior to NAF and more packets are queued for NAF then WBF, the router can increase the weighting for NAF queue to allow higher packet forwarding rate for NAFs. Similarly, when a NAF changes the flow behavior to WBF, the router can change the weighting for WBF queue to accommodate the change accordingly.

Packet Forwarding Process

Figure 1:
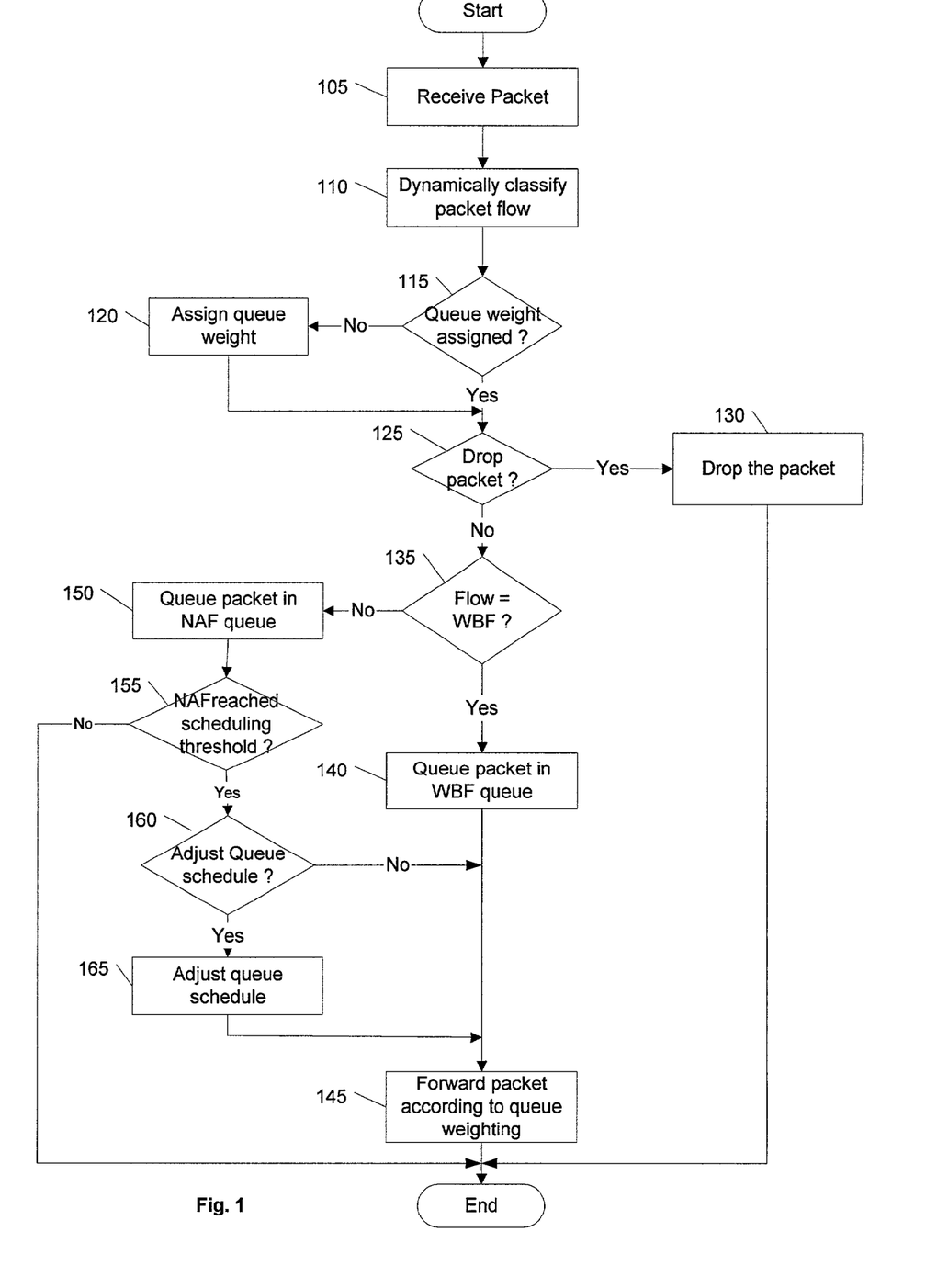
FIG. 1 illustrates the actions performed by a router during a process of forwarding packets according to an embodiment of the present invention.

FIG. 1 illustrates the actions performed by a router during a process of forwarding packets according to an embodiment of the present invention. The order in which the steps of the present method are performed is purely illustrative in nature. In fact, the steps can be performed in any order or in parallel. Initially, the router receives packets from a data flow (step 105). The router dynamically classifies packet flow based on the flow behavior (step 110). The flow behaviors can be classified based on various predefined flow characteristics (e.g., Quality of Service (QoS), type of data, protocol used or the like) or can be dynamically calculated based on the actual flow behaviors. The behaviors of packet flows are identified using conventional behavior classification schemes. One such scheme is defined in U.S. Pat. No. 6,515,963, entitled "Per Flow Dynamic Buffer Management," having David R. Cheritan and Andreas V. Bechtolsheim as inventors, which is hereby incorporated by reference, in its entirety and for all purposes.

The router determines whether the behavioral queues have assigned weighting (step 115). The queue weighting can be pre-assigned by the network administrator or the router can dynamically assign weighting to behavioral queue according to the traffic condition. The weighting can be based on the proportion of the available bandwidth (e.g. percentage of available bandwidth or the like) or predetermined data rate (e.g. 10 Mbps or the like) for each behavioral flow. If the weighting for behavioral flow is not pre-assigned, the router dynamically assigns a weight to behavioral queues according to the network traffic condition (e.g., available bandwidth on ports, amount of buffering available, number of queues available or the like) (step 120).

Next, the router determines whether to drop the packet (step 125). During traffic congestion, when the queues in the router get full, the router cannot process packets until the queue space becomes available. If the packet needs to be dropped, the router drops the packet (step 130). The router does not take any further action. If the router has queue space available then the router identifies the behavioral flow of the packet for queues. The router determines whether the packet belongs to a WBF flow (step 135). If the packet is a WBF packet, the router queues the packet in a WBF queue (step 140). The router can accumulate a number of packets in the appropriate queues. The router then forwards the packet according to assigned queue weighting and the forwarding scheme (e.g., accumulate a certain number of packets in the queues, forward packets at certain time interval, forward packets upon happening of certain event or the like) adopted by the router (step 145).

If the packet is not a WBF packet, the router queues the packet in a NAF queue (step 150). When packets are queued in different queues, the router schedules packet forwarding from each queue according to a weight assigned to each queue. The router does not schedule packets from a NAF queue until the NAF queue reaches a scheduling threshold. The scheduling threshold can be predetermined or dynamically calculated according to a resource planning in the router (e.g., the size of the NAF queue, allocated data rate for each behavioral flow or the like). The router then determines whether the NAF queue has reached the scheduling threshold (step 155). If the NAF queue has not reached the scheduling threshold, the router does not take any further action. If the NAF queue has reached the scheduling threshold, the router then determines whether the NAF queue scheduling needs adjustment (step 160).

When the router has extra bandwidth, the router can dynamically adjust the packet-forwarding schedule for each queue by altering assigned weighting for each queue. For example, when the WBF queue is not fully utilizing the allocated resources (e.g., bandwidth, ports, queues or the like), the router can dynamically increase the weighting of NAF queue (e.g., queue proportion, assigned data rate, or the like) to process relatively more packets from the NAF queue. The router determines whether to adjust the packet-forwarding schedule for the NAF queue (step 160). If the packet-forwarding schedule does not need adjustment, the router proceeds to forward the packet according to the queue weighting and the forwarding scheme adopted by the router (step 145). If the queue schedule requires adjustment, the router adjusts the queue weighting according to resource availability and network traffic condition (e.g., bandwidth utilization, port availability, packet data rate or the like) (step 165). The router then forwards the packet according to the queue weighting and the forwarding scheme adopted by the router (step 145).

An Example Computing and Network Environment

Figure 2:
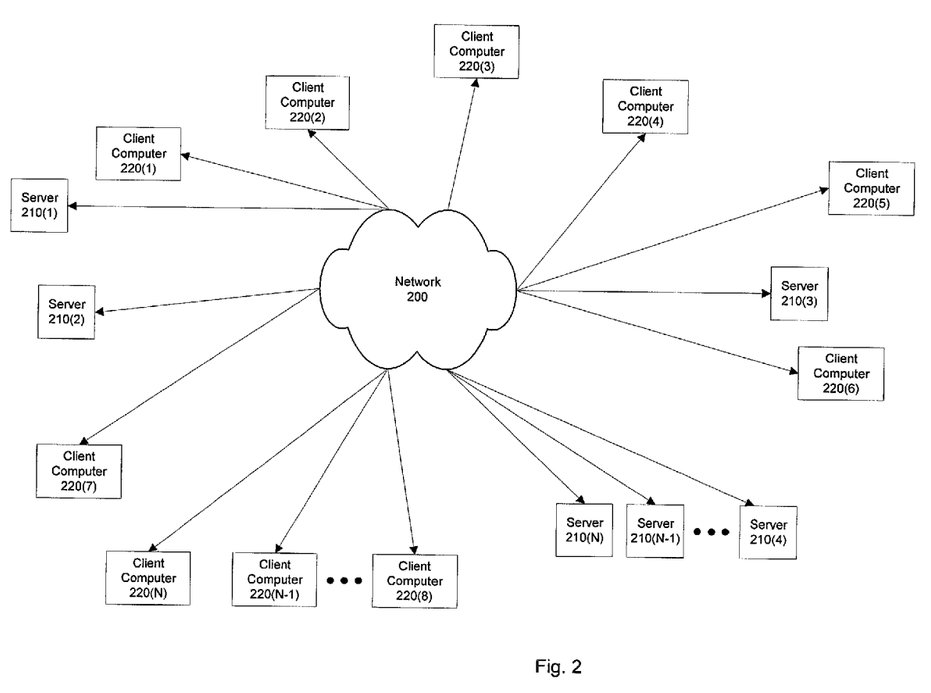
FIG. 2 is a block diagram illustrating a network environment in which commercial transaction processing according to embodiments of the present invention may be practiced.

FIG. 2 is a block diagram illustrating a network environment in which a system according to the present invention may be practiced. As is illustrated in FIG. 2, network 200 (e.g., wide area network, Internet or the like), includes a number of networked servers 210(1)–(N) that are accessible by client computers 220(1)–(N). Communication between client computers 220(1)–(N) and servers 210(1)–(N) typically occurs over a publicly accessible network, such as a public switched telephone network (PSTN), a DSL connection, a cable modem connection or large bandwidth trunks (e.g., communications channels providing T1, OC3 service or the like). Client computers 220(1)–(N) access servers 210(1)–(N) through, for example, a service provider. This might be, for example, an Internet Service Provider (ISP) such as America On-Line™, Prodigy™, CompuServe™ or the like. Access is typically had by executing application specific software (e.g., network connection software and a browser) on the given one of client computers 220(1)–(N).

One or more of client computers 220(1)–(N) and/or one or more of servers 210(1)–(N) can be, for example, a computer system of any appropriate design (e.g., a mainframe, a mini-computer, a personal computer system or the like). Such a computer system typically includes a system unit having a system processor and associated volatile and non-volatile memory, one or more display monitors and keyboards, one or more diskette drives, one or more fixed disk storage devices and one or more printers. These computer systems are typically information handling systems that are designed to provide computing power to one or more users, either locally or remotely. Such a computer system may also include one or more peripheral devices which are coupled to the system processor and which perform specialized functions. Examples of peripheral devices include modems, sound and video devices and specialized communication devices. Mass storage devices such as hard disks, CD-ROM drives and magneto-optical drives can also be provided, either as an integrated or peripheral device. One such example computer system, discussed in terms of client computers 220(1)–(N) is shown in detail in FIG. 3.

It will be noted that the variable identifier "N" is used in several instances in FIG. 2 to more simply designate the final element (e.g., servers 210(1)–(N) and client computers 220(1)–(N)) of a series of related or similar elements (e.g., servers and client computers). The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified by "N" may hold the same or a different value than other instances of the same variable identifier.

Figure 3:
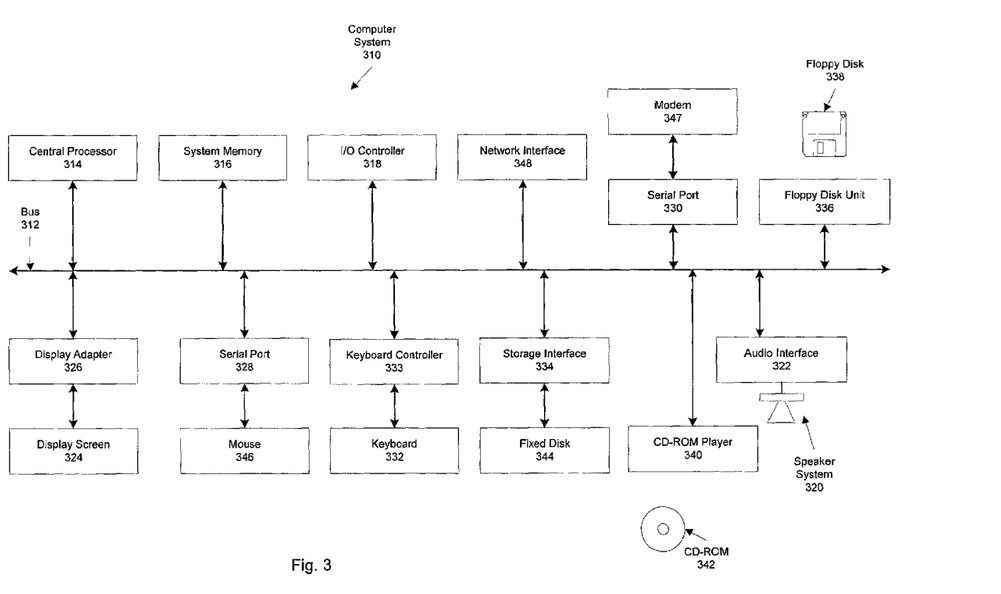
FIG. 3 is a block diagram illustrating a computer system suitable for implementing embodiments of the present invention.

FIG. 3 depicts a block diagram of a computer system 310 suitable for implementing the present invention, and example of one or more of client computers 220(1)–(N). Computer system 310 includes a bus 312 which interconnects major subsystems of computer system 310 such as a central processor 314, a system memory 316 (typically RAM, but which may also include ROM, flash RAM, or the like), an input/output controller 318, an external audio device such as a speaker system 320 via an audio output interface 322, an external device such as a display screen 324 via display adapter 326, serial ports 328 and 330, a keyboard 332 (interfaced with a keyboard controller 333), a storage interface 334, a floppy disk drive 336 operative to receive a floppy disk 338, and a CD-ROM drive 340 operative to receive a CD-ROM 342. Also included are a mouse 346 (or other point-and-click device, coupled to bus 312 via serial port 328), a modem 347 (coupled to bus 312 via serial port 330) and a network interface 348 (coupled directly to bus 312).

Bus 312 allows data communication between central processor 314 and system memory 316, which may include both read only memory (ROM) or flash memory (neither shown), and random access memory (RAM) (not shown), as previously noted. The RAM is generally the main memory into which the operating system and application programs are loaded and typically affords at least 13 megabytes of memory space. The ROM or flash memory may contain, among other code, the Basic Input-Output system (BIOS) which controls basic hardware operation such as the interaction with peripheral components. Applications resident with computer system 310 are generally stored on and accessed via a computer readable medium, such as a hard disk drive (e.g., fixed disk 344), an optical drive (e.g., CD-ROM drive 340), floppy disk unit 336 or other storage medium. Additionally, applications may be in the form of electronic signals modulated in accordance with the application and data communication technology when accessed via network modem 347 or network interface 348.

Storage interface 334, as with the other storage interfaces of computer system 310, may connect to a standard computer readable medium for storage and/or retrieval of information, such as a fixed disk drive 344. Fixed disk drive 344 may be a part of computer system 310 or may be separate and accessed through other interface systems. Many other devices can be connected such as a mouse 346 connected to bus 312 via serial port 328, a modem 347 connected to bus 312 via serial port 330 and a network interface 348 connected directly to bus 312. Modem 347 may provide a direct connection to a remote server via a telephone link or to the Internet via an internet service provider (ISP). Network interface 348 may provide a direct connection to a remote server via a direct network link to the Internet via a POP (point of presence). Network interface 348 may provide such connection using wireless techniques, including digital cellular telephone connection, Cellular Digital Packet Data (CDPD) connection, digital satellite data connection or the like. The computer system 310 may include a number of network interface 348 to provide multiple packet interface within the network.

Many other devices or subsystems (not shown) may be connected in a similar manner (e.g., bar code readers, document scanners, digital cameras and so on). Conversely, it is not necessary for all of the devices shown in FIG. 3 to be present to practice the present invention. The devices and subsystems may be interconnected in different ways from that shown in FIG. 3. The operation of a computer system such as that shown in FIG. 3 is readily known in the art and is not discussed in detail in this application. Code to implement the present invention may be stored in computer-readable storage media such as one or more of system memory 316, fixed disk 344, CD-ROM 342, or floppy disk 338. Additionally, computer system 310 may be any kind of computing device, and so includes personal data assistants (PDAs), network appliance, X-window terminal or other such computing device. The operating system provided on computer system 310 may be MS-DOS®, MS-WINDOWS®, OS/2®, UNIX®, Linux® or other known operating system. Computer system 310 also supports a number of Internet access tools, including, for example, an HTTP-compliant web browser having a JavaScript interpreter, such as Netscape Navigator®, Microsoft Explorer® and the like.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of computer system 310). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Figure 4:
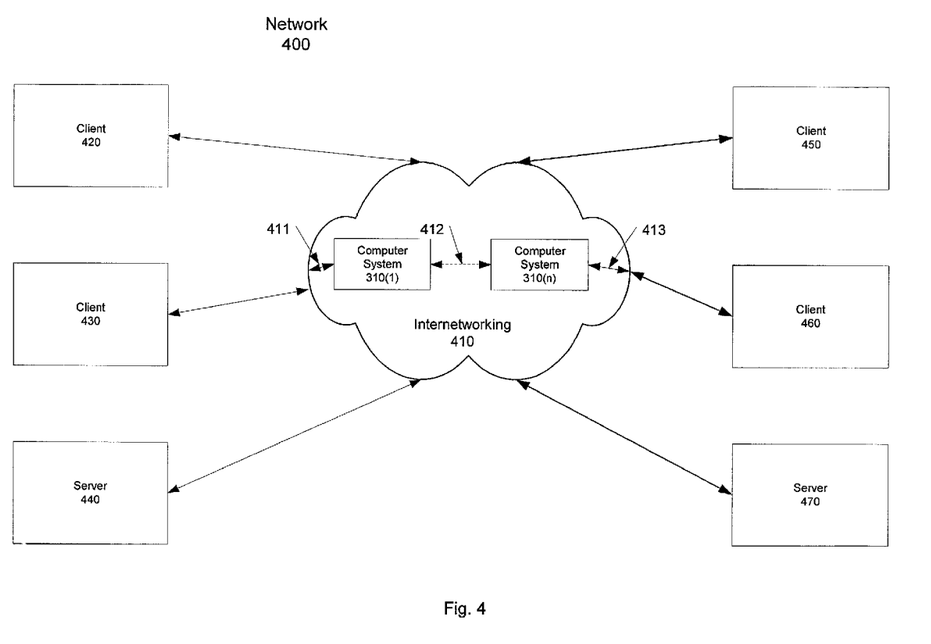
FIG. 4 is a block diagram illustrating the interconnection of the computer system of FIG. 3 to client and host systems.

FIG. 4 is a block diagram depicting a network 400 in which computer system 310 forms an internetworking 410. Computer systems 310(1)–310(n) are coupled to form an internetwork 410, which is coupled, in turn, to client systems 420, 430, 450 and 460 as well as servers 440 and 470. Computer systems 310(1)–310(n) are coupled to other network elements via links 411 and 413. Links 411 and 413 can be any link (e.g., multiplexed links, multiple individual links or the like). Computer systems 310(1)–310(n) are interconnected vial link a 412. Link 412 can be any link (e.g., multiplexed links, multiple individual links or the like). It will be apparent to one skilled in art that Internetworking 510 can be any computer system (e.g., router or the like) with multiple links to couple various network elements in the networks (e.g., servers, clients, other routers or the like). Internetwork 410 (e.g., the Internet) is also capable of coupling client systems 420 and 430, and server 440 to one another. With reference to computer system 310, modem 347, network interface 348 or some other method can be used to provide connectivity from computer systems 310(1)–310(n) to various network components (e.g., clients, servers, other computer systems or the like). Client systems 420, 430, 450 and 460 are able to access information on server 440 and 470 using, for example, a web browser (not shown). Such a web browser allows client systems 420, 430, 450 and 470, to access data on servers 440 and 470 representing the pages of a website hosted on servers 440 and 470. Protocols for exchanging data via the Internet are well known to those skilled in the art. Although FIG. 4 depicts the use of the Internet for exchanging data, the present invention is not limited to the Internet or any particular network-based environment.

Referring to FIGS. 2, 3 and 4, a browser running on computer system 310 employs a TCP/IP connection to pass a request to server 440, which can run an HTTP "service" (e.g., under the WINDOWS® operating system) or a "daemon" (e.g., under the UNIX® operating system), for example. Such a request can be processed, for example, by contacting an HTTP server employing a protocol that can be used to communicate between the HTTP server and the client computer. The HTTP server then responds to the protocol, typically by sending a "web page" formatted as an HTML file. The browser interprets the HTML file and may form a visual representation of the same using local resources (e.g., fonts and colors).

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A method of forwarding packets comprising:
   classifying a packet from a plurality of packets according to a classification, wherein the classification is one of a plurality of classifications;
   storing the packet in one of a plurality of behavioral queues corresponding to the classification, wherein each behavioral queue corresponds to one of a plurality of flow behaviors associated with the classification;
   assigning a weighting to said plurality of behavioral queues; and
   forwarding the packet from said behavioral queue according to said weighting.

2. The method of claim 1, wherein one of said flow behaviors is a well behaved flow.

3. The method of claim 1, wherein one of said flow behavior is a non-adaptive aggressive flow.

4. The method of claim 1, wherein said weighting is predetermined.

5. The method of claim 1 wherein said weighting is dynamically calculated according to a network traffic condition including one or more of:
   available output data bandwidth;
   available input data buffering space; and
   available number of said plurality of behavioral queues.

6. The method of claim 1, wherein said weighting is based on a proportion of a size of said plurality of behavioral queues.

7. The method of claim 1, wherein said weighting is based on a data rate of said plurality of packets.

8. The method of claim 1, further comprising:
   classifying said plurality of packets according to said plurality of flow behaviors.

9. The method of claim 8, wherein said plurality of packets is dynamically classified according to said plurality of flow behaviors.

10. The method of claim 8, wherein said plurality of packets is dynamically classified according to a plurality of predefined packet parameters.

11. The method of claim 8, further comprising:
    receiving said plurality of packets.

12. The method of claim 11, further comprising:
    if said plurality of behavioral queues is full,
    dropping said plurality of packets.

13. The method of claim 12, further comprising:
    if said plurality of packets have said well behaved flow,
    storing said plurality of packets in a well behaved flow behavioral queue.

14. The method of claim 13, further comprising:
    forwarding said plurality of packets according to said weighting of said well behaved queue.

15. The method of claim 12, further comprising:
    if said plurality of packets have said non-adaptive aggressive flow, storing said plurality of packets in a non-adaptive aggressive flow behavioral queue.

16. The method of claim 15, further comprising:
determining whether said non-adaptive aggressive flow behavioral queue has reached a scheduling threshold, wherein
said scheduling threshold is a percentage of a length of the non-adaptive aggressive flow behavioral queue.

17. The method of claim 16, wherein said scheduling threshold is predetermined.

18. The method of claim 16, wherein said scheduling threshold is dynamically calculated according to a network condition.

19. The method of claim 16, wherein said scheduling threshold is based on a size of said non-adaptive aggressive flow behavioral queue.

20. The method of claim 16, wherein said scheduling threshold is based on a data rate of said plurality of packets.

21. The method of claim 16, further comprising:
if said non-adaptive aggressive flow behavioral queue has reached said scheduling threshold,
determining whether a packet forwarding schedule of said non-adaptive aggressive flow behavioral queue requires adjustment.

22. The method of claim 21, further comprising:
if said packet forwarding schedule of said non-adaptive aggressive flow behavioral queue requires adjustment, adjusting said packet forwarding schedule of said non-adaptive aggressive flow behavioral queue.

23. The method of claim 22, further comprising:
forwarding said plurality of packets according to said weighting of said non-adaptive aggressive flow behavioral queue.

24. The method of claim 22, wherein said adjusting of said packet forwarding schedule of said non-adaptive aggressive flow behavioral queue is done according to a predetermined scheme.

25. The method of claim 22, wherein said adjusting of said packet forwarding schedule of said non-adaptive aggressive flow behavioral queue is done dynamically according to said network traffic condition.

26. The method of claim 21, further comprising:
if said packet forwarding schedule of said non-adaptive aggressive flow behavioral queue does not require adjustment,
forwarding said plurality of packets according to said weighting of said non-adaptive aggressive flow behavioral queue.

27. A network element comprising:
means for classifying a packet from a plurality of packets according to a classification, wherein
the classification is one of a Plurality of classifications;
means for storing the packet in one of a plurality of behavioral queues corresponding to the classification, wherein
each behavioral queue corresponds to one of a plurality of flow behaviors associated with the classification;
means for assigning a weighting to said plurality of behavioral queues; and
means for forwarding the packet from said behavioral queue according to said weighting.

28. The network element of claim 27, wherein one of said flow behaviors is a well behaved flow.

29. The network element of claim 27, wherein one of said flow behavior is a non-adaptive aggressive flow.

30. The network element of claim 27, wherein said weighting is predetermined.

31. The network element of claim 27 wherein said weighting is dynamically calculated according to a network traffic condition including one or more of:
available output data bandwidth;
available input data buffering space; and
available number of said plurality of behavioral queues.

32. The network element of claim 27, wherein said weighting is based on a proportion of a size of said plurality of behavioral queues.

33. The network element of claim 27, wherein said weighting is based on a data rate of said plurality of packets.

34. The network element of claim 27, further comprising:
means for classifying said plurality of packets according to said plurality of flow behaviors.

35. The network element of claim 34, wherein said plurality of packets is dynamically classified according to said plurality of flow behaviors.

36. The network element of claim 34, wherein said plurality of packets is dynamically classified according to a plurality of predefined packet parameters.

37. The network element of claim 8, further comprising:
means for receiving said plurality of packets.

38. The network element of claim 37, further comprising:
means for dropping said plurality of packets if said plurality of behavioral queues is full.

39. The network element of claim 38, further comprising:
means for storing said plurality of packets in a well behaved flow behavioral queue if said plurality of packets have said well behaved flow.

40. The network element of claim 39, further comprising:
means for forwarding said plurality of packets according to said weighting of said well behaved queue.

41. The network element of claim 38, further comprising:
means for storing said plurality of packets in a non-adaptive aggressive flow behavioral queue if said plurality of packets have said non-adaptive aggressive flow.

42. The network element of claim 41, further comprising:
means for determining whether said non-adaptive aggressive flow behavioral queue has reached a scheduling threshold, wherein
said scheduling threshold is a percentage of a length of the non-adaptive aggressive flow behavioral queue.

43. The network element of claim 42, wherein said scheduling threshold is predetermined.

44. The network element of claim 42, wherein said scheduling threshold is dynamically calculated according to a network condition.

45. The network element of claim 42, wherein said scheduling threshold is based on a size of said non-adaptive aggressive flow behavioral queue.

46. The network element of claim 42, wherein said scheduling threshold is based on a data rate of said plurality of packets.

47. The network element of claim 42, further comprising:
means for determining whether a packet forwarding schedule of said non-adaptive aggressive flow behavioral queue requires adjustment if said non-adaptive aggressive flow behavioral queue has reached said scheduling threshold.

48. The network element of claim 47, further comprising:
means for adjusting said packet forwarding schedule of said non-adaptive aggressive flow behavioral queue if said packet forwarding schedule of said non-adaptive aggressive flow behavioral queue requires adjustment.

49. The network element of claim 48, further comprising:
means for forwarding said plurality of packets according to said weighting of said non-adaptive aggressive flow behavioral queue.

50. The network element of claim 48, wherein said adjusting of said packet forwarding schedule of said non-adaptive aggressive flow behavioral queue is done according to a predetermined scheme.

51. The network element of claim 48, wherein said adjusting of said packet forwarding schedule of said non-adaptive aggressive flow behavioral queue is done dynamically according to said network traffic condition.

52. The network element of claim 47, further comprising:
means for forwarding said plurality of packets according to said weighting of said non-adaptive aggressive flow behavioral queue if said packet forwarding schedule of said non-adaptive aggressive flow behavioral queue does not require adjustment.

53. A computer program product for forwarding packets, encoded in computer readable media, said program product comprising a set of instructions executable on a computer system, said set of instructions is configured to
classify a packet from a plurality of packets according to a classification, wherein the classification is one of a plurality of classifications;
store the packet in one of a plurality of behavioral queues corresponding to the classification,
wherein
each behavioral queue corresponds to one of a plurality of flow behaviors associated with the classification;
assign a weighting to said plurality of behavioral queues; and
forward the packet from said behavioral queue according to said weighting.

54. The computer program product of claim 53, wherein one of said flow behaviors is a well behaved flow.

55. The computer program product of claim 53, wherein one of said flow behavior is a non-adaptive aggressive flow.

56. The computer program product of claim 53, wherein said weighting is predetermined.

57. The computer program product of claim 53 wherein said weighting is dynamically calculated according to a network traffic condition including one or more of:
available output data bandwidth;
available input data buffering space; and
available number of said plurality of behavioral queues.

58. The computer program product of claim 53, wherein said weighting is based on a proportion of a size of said plurality of behavioral queues.

59. The computer program product of claim 53, wherein said weighting is based on a data rate of said plurality of packets.

60. The computer program product of claim 53, said set of instructions is further configured to:
classify said plurality of packets according to said plurality of flow behaviors.

61. The computer program product of claim 60, wherein said plurality of packets is dynamically classified according to said plurality of flow behaviors.

62. The computer program product of claim 60, wherein said plurality of packets is dynamically classified according to a plurality of predefined packet parameters.

63. The computer program product of claim 60, said set of instructions is further configured to receive said plurality of packets.

64. The computer program product of claim 63, said set of instructions is further configured to
if said plurality of behavioral queues is full,
drop said plurality of packets.

65. The computer program product of claim 64, said set of instructions is further configured to
if said plurality of packets have said well behaved flow,
store said plurality of packets in a well behaved flow behavioral queue.

66. The computer program product of claim 65, said set of instructions is further configured to
forward said plurality of packets according to said weighting of said well behaved queue.

67. The computer program product of claim 64, said set of instructions is further configured to
if said plurality of packets have said non-adaptive aggressive flow,
store said plurality of packets in a non-adaptive aggressive flow behavioral queue.

68. The computer program product of claim 67, said set of instructions is further configured to
determine whether said non-adaptive aggressive flow behavioral queue has reached a scheduling threshold, wherein
said scheduling threshold is a percentage of a length of the non-adaptive aggressive flow behavioral queue.

69. The computer program product of claim 68, wherein said scheduling threshold is predetermined.

70. The computer program product of claim 68, wherein said scheduling threshold is dynamically calculated according to a network condition.

71. The computer program product of claim 68, wherein said scheduling threshold is based on a size of said non-adaptive aggressive flow behavioral queue.

72. The computer program product of claim 68, wherein said scheduling threshold is based on a data rate of said plurality of packets.

73. The computer program product of claim 68, said set of instructions is further configured to
if said non-adaptive aggressive flow behavioral queue has reached said scheduling threshold,
determine whether a packet forwarding schedule of said non-adaptive aggressive flow behavioral queue requires adjustment.

74. The computer program product of claim 73, said set of instructions is further configured to
if said packet forwarding schedule of said non-adaptive aggressive flow behavioral queue requires adjustment,
adjust said packet forwarding schedule of said non-adaptive aggressive flow behavioral queue.

75. The computer program product of claim 74, said set of instructions is further configured to
forward said plurality of packets according to said weighting of said non-adaptive aggressive flow behavioral queue.

76. The computer program product of claim 74, wherein said adjusting of said packet forwarding schedule of said non-adaptive aggressive flow behavioral queue is done according to a predetermined scheme.

77. The computer program product of claim 74, wherein said adjusting of said packet forwarding schedule of said non-adaptive aggressive flow behavioral queue is done dynamically according to said network traffic condition.

78. The computer program product of claim 73, said set of instructions is further configured to
if said packet forwarding schedule of said non-adaptive aggressive flow behavioral queue does not require adjustment, forward said plurality of packets according to said weighting of said non-adaptive aggressive flow behavioral queue.

79. A network element comprising:
a processor;
a memory coupled to said processor; and
a network interface coupled to said processor, said processor is configured to
classify a packet from a plurality of packets according to a classification,
wherein
the classification is one of a plurality of classifications;
store the packet in one of a plurality of behavioral queues corresponding to the classification, wherein each behavioral queue corresponds to one of a plurality of flow behaviors associated with the classification,
assign a weighting to said plurality of behavioral queues, and
forward the packet from said behavioral queue according to said weighting.

80. The network element of claim 79, wherein one of said flow behaviors is a well behaved flow.

81. The network element of claim 79, wherein one of said flow behavior is a non-adaptive aggressive flow.

82. The network element of claim 79, wherein said weighting is predetermined.

83. The network element of claim 79 wherein said weighting is dynamically calculated according to a network traffic condition including one or more of:
available output data bandwidth;
available input data buffering space; and
available number of said plurality of behavioral queues.

84. The network element of claim 79, wherein said weighting is based on a proportion of a size of said plurality of behavioral queues.

85. The network element of claim 79, wherein said weighting is based on a data rate of said plurality of packets.

86. The network element of claim 79, said processor is further configured to classify said plurality of packets according to said plurality of flow behaviors.

87. The network element of claim 86, wherein said plurality of packets is dynamically classified according to said plurality of flow behaviors.

88. The network element of claim 86, wherein said plurality of packets is dynamically classified according to a plurality of predefined packet parameters.

89. The network element of claim 86, said processor is further configured to
receive said plurality of packets.

90. The network element of claim 89, said processor is further configured to
if said plurality of behavioral queues is full,
drop said plurality of packets.

91. The network element of claim 90, said processor is further configured to
if said plurality of packets have said well behaved flow,
store said plurality of packets in a well behaved flow behavioral queue.

92. The network element of claim 91, said processor is further configured to
forward said plurality of packets according to said weighting of said well behaved queue.

93. The network element of claim 90, said processor is further configured to
if said plurality of packets have said non-adaptive aggressive flow,
store said plurality of packets in a non-adaptive aggressive flow behavioral queue.

94. The network element of claim 93, said processor is further configured to
determine whether said non-adaptive aggressive flow behavioral queue has reached a scheduling threshold,
wherein
said scheduling threshold is a percentage of a length of the non-adaptive aggressive flow behavioral queue.

95. The network element of claim 94, wherein said scheduling threshold is predetermined.

96. The network element of claim 94, wherein said scheduling threshold is dynamically calculated according to a network condition.

97. The network element of claim 94, wherein said scheduling threshold is based on a size of said non-adaptive aggressive flow behavioral queue.

98. The network element of claim 94, wherein said scheduling threshold is based on a data rate of said plurality of packets.

99. The network element of claim 94, said processor is further configured to
if said non-adaptive aggressive flow behavioral queue has reached said scheduling threshold,
determine whether a packet forwarding schedule of said non-adaptive aggressive flow behavioral queue requires adjustment.

100. The network element of claim 99, said processor is further configured to
if said packet forwarding schedule of said non-adaptive aggressive flow behavioral queue requires adjustment, adjust said packet forwarding schedule of said non-adaptive aggressive flow behavioral queue.

101. The network element of claim 100, said processor is further configured to
forward said plurality of packets according to said weighting of said non-adaptive aggressive flow behavioral queue.

102. The network element of claim 100, wherein said adjusting of said packet forwarding schedule of said non-adaptive aggressive flow behavioral queue is done according to a predetermined scheme.

103. The network element of claim 100, wherein said adjusting of said packet forwarding schedule of said non-adaptive aggressive flow behavioral queue is done dynamically according to said network traffic condition.

104. The network element of claim 99, said processor is further configured to
if said packet forwarding schedule of said non-adaptive aggressive flow behavioral queue does not require adjustment,
forward said plurality of packets according to said weighting of said non-adaptive aggressive flow behavioral queue.

* * * * *